United States Patent
Wang et al.

(10) Patent No.: US 11,538,371 B2
(45) Date of Patent: Dec. 27, 2022

(54) DISPLAY APPARATUS AND ELECTRONIC DEVICE

(71) Applicant: BOE TECHNOLOGY GROUP CO., LTD., Beijing (CN)

(72) Inventors: Zongyuan Wang, Beijing (CN); Lu Liu, Beijing (CN); Lupeng Bian, Beijing (CN); Yanyan Yang, Beijing (CN); Biao Gao, Beijing (CN); Xiaolin Liu, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 1 day.

(21) Appl. No.: 17/363,041

(22) Filed: Jun. 30, 2021

(65) Prior Publication Data

US 2021/0407345 A1 Dec. 30, 2021

(30) Foreign Application Priority Data

Jun. 30, 2020 (CN) .......................... 202010611339.0

(51) Int. Cl.
  *G06F 1/16* (2006.01)
  *G09F 9/30* (2006.01)
(52) U.S. Cl.
  CPC ............ *G09F 9/301* (2013.01); *G06F 1/1624* (2013.01); *G06F 1/1652* (2013.01)
(58) Field of Classification Search
  CPC combination set(s) only.
  See application file for complete search history.

(56) References Cited

U.S. PATENT DOCUMENTS 8,711,566 B2 * 4/2014 O'Brien ................ G06F 1/1624
  361/724
9,195,272 B2 * 11/2015 O'Brien ................ G06F 1/1652
  (Continued)

FOREIGN PATENT DOCUMENTS

CN    102902308 A    1/2013
CN    105391009 A    3/2016
  (Continued)

OTHER PUBLICATIONS

China National Intellectual Property Administration, Second office action of Chinese application No. 202010611339.0 dated Feb. 23, 2022, which is foreign counterpart application of this US application.

(Continued)

*Primary Examiner* — Lisa Lea-Edmonds
(74) *Attorney, Agent, or Firm* — Fay Sharpe LLP

(57) ABSTRACT

A display apparatus and an electronic device relating to the field of display technologies are provided. The display apparatus includes: a first housing, one end of which includes an opening; a second housing slidably connected to the first housing and configured to slide out of a cavity of the first housing via the opening of the first housing; a flexible display screen configured to slide out of the cavity of the first housing along with the second housing when the second housing slides out of the cavity of the first housing; and at least one elastic assembly configured to provide an elastic force to the second housing when the second housing slides out of the cavity of the first housing so that a second lateral outer surface is kept flush with the first lateral outer surface.

20 Claims, 6 Drawing Sheets

(56) References Cited

U.S. PATENT DOCUMENTS

| | | | |
|---|---|---|---|
| 10,416,796 B2 * | 9/2019 | Song | H01L 51/5237 |
| 10,955,876 B1 * | 3/2021 | Song | G06F 1/1656 |
| 10,963,014 B1 * | 3/2021 | Park | H04B 1/3827 |
| 11,003,219 B1 * | 5/2021 | Kim | G06F 1/1624 |
| 11,016,532 B2 * | 5/2021 | Yang | G06F 1/1616 |
| 11,140,252 B1 * | 10/2021 | Choi | H05K 5/0017 |
| 11,226,655 B2 * | 1/2022 | Shim | G06F 1/1684 |
| 11,243,577 B2 * | 2/2022 | Kim | G06F 1/1652 |
| 11,307,617 B2 * | 4/2022 | Ko | G06F 1/1656 |
| 11,375,053 B2 * | 6/2022 | Song | H04M 1/0237 |
| 11,416,036 B2 * | 8/2022 | Yin | G06F 1/1656 |
| 2013/0058063 A1 | 3/2013 | O'Brien | |
| 2019/0339742 A1 | 11/2019 | Mayuhu et al. | |
| 2021/0076517 A1 | 3/2021 | Wang et al. | |
| 2021/0120111 A1 * | 4/2021 | Choi | G06F 1/1675 |
| 2021/0303027 A1 * | 9/2021 | Kim | G06F 3/14 |
| 2022/0240400 A1 * | 7/2022 | Zhou | H05K 5/0017 |
| 2022/0263932 A1 * | 8/2022 | Jo | H04M 1/0268 |

FOREIGN PATENT DOCUMENTS

| | | |
|---|---|---|
| CN | 107166340 A | 9/2017 |
| CN | 108519795 A | 9/2018 |
| CN | 109028640 A | 12/2018 |
| CN | 110047385 A | 7/2019 |
| CN | 209356215 U | 9/2019 |
| CN | 110706600 A | 1/2020 |
| CN | 111028688 A | 4/2020 |
| CN | 111243438 A | 6/2020 |
| CN | 111261049 A | 6/2020 |

OTHER PUBLICATIONS

First office action of Chinese application No. 202010611339.0 dated Aug. 12, 2021.

* cited by examiner

DISPLAY APPARATUS AND ELECTRONIC DEVICE

CROSS-REFERENCE TO RELATED APPLICATION

This application claims priority to the Chinese Patent Application No. 202010611339.0, filed on Jun. 30, 2020 and entitled "DISPLAY APPARATUS AND ELECTRONIC DEVICE", the disclosure of which is herein incorporated by reference in its entirety.

TECHNICAL FIELD

The present disclosure relates to the technical field of display apparatuses, and in particular to a display apparatus and an electronic device.

BACKGROUND

With development of display panel technologies, a certain degree of folding and bending of screens can be realized by virtue of good flexible features of flexible display screens. And a technology of stretching and enlarging a display screen of a terminal using a scroll function is developed.

SUMMARY

Embodiments of the present disclosure provide a display apparatus and an electronic device. The major technical solutions of the present disclosure are as below.

According to an aspect, an embodiment of the present disclosure provides a display apparatus. The display apparatus includes:

a first housing, one end of which comprises an opening;

a second housing slidably connected to the first housing and configured to slide out of a cavity of the first housing via the opening of the first housing;

a flexible display screen, wherein a first end of the flexible display screen is connected to a first lateral outer surface of the first housing; a second end of the flexible display screen bypasses one end of the second housing away from the first housing and connects to the inside of the first housing; and the flexible display screen is configured to slide out of the cavity of the first housing along with the second housing when the second housing slides out of the cavity of the first housing; and at least one elastic assembly configured to provide an elastic force to the second housing when the second housing slides out of the cavity of the first housing so that a second lateral outer surface is kept flush with the first lateral outer surface, wherein the second lateral outer surface is a surface of the second housing close to the first lateral outer surface.

Optionally, the second housing includes a cavity, and one end of the second housing close to the first housing includes an opening.

Optionally, the second housing includes a movable plate and a fixed base, and a surface of the movable plate close to the first lateral outer surface is the second lateral outer surface; and the elastic assembly is disposed on one side of the fixed base facing the movable plate.

Optionally, the elastic assembly includes a mounting base and an elastic piece;

the mounting base is disposed on one side of the fixed base facing the movable plate; the mounting base includes a cavity; and one end of the mounting base facing the movable plate includes an opening; and the elastic piece is disposed in the cavity of the mounting base and configured to abut on the movable plate and the mounting base.

Optionally, one side of the movable plate facing the fixed base includes a limit post, and the limit post is configured to abut on the elastic piece.

Optionally, the elastic piece surrounds the limit post along a circumferential direction of the limit post.

Optionally, a length of the limit post is greater than a thickness of the movable plate; and a thickness direction of the movable plate intersects a radial direction of the limit post.

Optionally, one side of the movable plate facing the fixed base includes a first limiting piece; the mounting base includes a second limiting piece matching the first limiting piece; and when the movable plate moves away from the fixed base under the action of the elastic force, the second limiting piece is configured to abut on the first limiting piece, to ensure that the movable plate moves within a preset distance.

Optionally, a surface of a first side of the first housing includes a first fastener; and a surface of the second housing close to the first side of the first housing includes a second fastener matching the first fastener; and the second fastener is configured to clamp on the first fastener when the second housing slides out of the cavity of the first housing by a sliding distance.

Optionally, the surface of the first side of the first housing includes a plurality of groups of first fasteners; the plurality of groups of first fasteners correspond to a plurality of sliding distances; and a group of first fasteners corresponding to any of the sliding distances is configured to clamp on the second fastener when the second housing slides out of the cavity of the first housing by the any of the sliding distances.

Optionally, the surface of the second housing close to the first side of the first housing includes a plurality of groups of second fasteners matching the first fastener; the plurality of groups of second fasteners correspond to a plurality of sliding distances; and a group of second fasteners corresponding to any of the sliding distances is configured to clamp on the first fastener when the second housing slides out of the cavity of the first housing by the any of the sliding distances.

Optionally, there are a plurality of first fasteners and a plurality of second fasteners which correspond to a same sliding distance.

Optionally, the inside of the first housing includes a winding component; a second end of the flexible display screen is connected to the winding component; and the flexible display screen is further configured to: under the action of the winding component, slide into the first housing along with the second housing when the second housing slides into the first housing.

Optionally, the display apparatus further includes a sensor; and the sensor is electrically connected to the winding component, and is configured to: send a working signal indicating an execution of winding to the winding component when detecting that a distance between the second lateral outer surface and a third lateral outer surface is becoming smaller, or send a working signal indicating a stopping of winding to the winding component when detecting that the distance between the second lateral outer surface and the third lateral outer surface is becoming larger or remains unchanged, wherein the third lateral outer surface is an outer surface of the second housing away from the first lateral outer surface.

Optionally, the winding component includes a winding motor and a winding shaft; the sensor is electrically connected to the winding motor; the winding shaft is connected to an output end of the winding motor; and the winding motor is configured to work based on the signals.

Optionally, the display apparatus further includes a flexible connector; the flexible connector is configured to connect the flexible display screen to the winding shaft; and when the second housing completely slides into the first housing, at least part of the flexible connector is wound on the winding shaft, while the flexible display screen is not wound on the winding shaft.

Optionally, the end of the second housing away from the first housing includes a depression bar; and the depression bar is configured to: when the second housing slides out of the cavity of the first housing by the sliding distance, press the flexible display screen at the end of the second housing away from the first housing.

Optionally, the flexible display screen includes a first part and a second part which are connected to each other; the first part is laid on the first lateral outer surface; and the second part is configured to: when the second housing slides out of the cavity of the first housing, slide out of the cavity of the first housing along with the second housing, and be laid on the second lateral outer surface.

Optionally, the second part is further configured to: under the action of the winding component, slide into the first housing along with the second housing when the second housing slides into the first housing.

According to another aspect, an embodiment of the present disclosure provides an electronic device including the foregoing display apparatus.

DETAILED DESCRIPTION

To further describe the technical means and effects adopted by the present disclosure to achieve a predetermined inventive objective, the following describes a display apparatus and its specific implementations, structure, features and effects provided in the present disclosure in detail with reference to the accompanying drawings and exemplary embodiments. In the following descriptions, "an embodiment" or "embodiments" at different locations do not necessarily mean a same embodiment. In addition, specific features, structures, or characteristics in one or more embodiments may be combined in any appropriate form.

At present, a display device with a stretchable or slidable flexible display screen is designed based on a flexible display screen. The display device includes a first housing, a second housing and a flexible display screen. The second housing can slide into and slide out of a cavity of the first housing. The flexible display screen includes two parts. The first part of the flexible display screen is usually laid on a surface of the first housing, wherein the surface is used to support the first part of the flexible display screen. The second part of the flexible display screen can slide around a scroll. In addition, when the second housing is disposed in the cavity of the first housing, the second part of the flexible display screen can be stored in the cavity of the first housing; and when the second housing slides out of the first housing, the second part of the flexible display screen can be laid on a surface of the second housing, wherein the surface is used to support the second part of the flexible display screen. Compared with a case when the second part of the flexible display screen is stored in the cavity of the first housing, when the second part of the flexible display screen is laid on the surface of the second housing, an image display area of the display device is enlarged, that is, a display screen can be stretched and enlarged.

However, when the second housing slides out of the first housing, there is a level difference between the surface of the second housing for supporting the flexible display screen and the surface of the first housing for supporting the flexible display screen in a vertical lamination direction. Due to the level difference, a mold mark is easily formed on the flexible display screen, and a supporting force of the second housing on the second part of the flexible display screen is weak.

Figure 1:
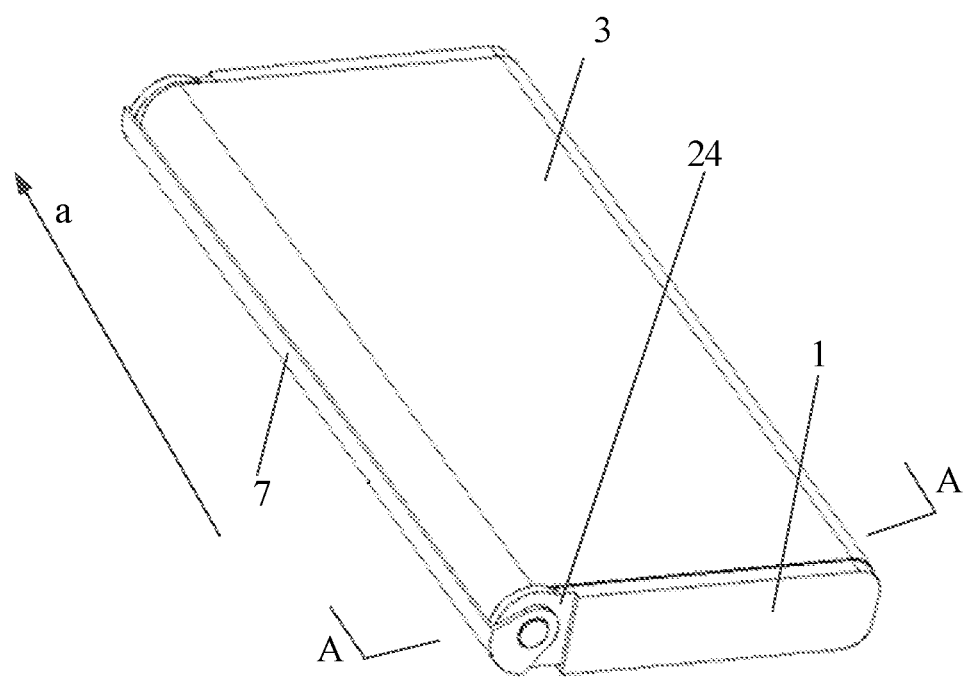
FIG. 1 is a schematic structural diagram of a display apparatus according to an embodiment of the present disclosure.
Figure 2:
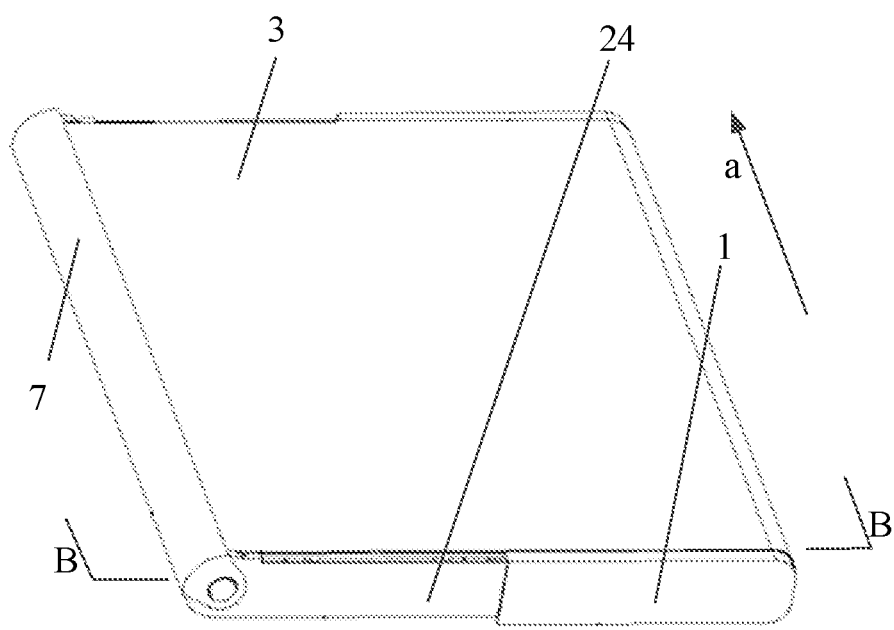
FIG. 2 is a schematic diagram of a use state of a display apparatus according to an embodiment of the present disclosure.
Figure 3:
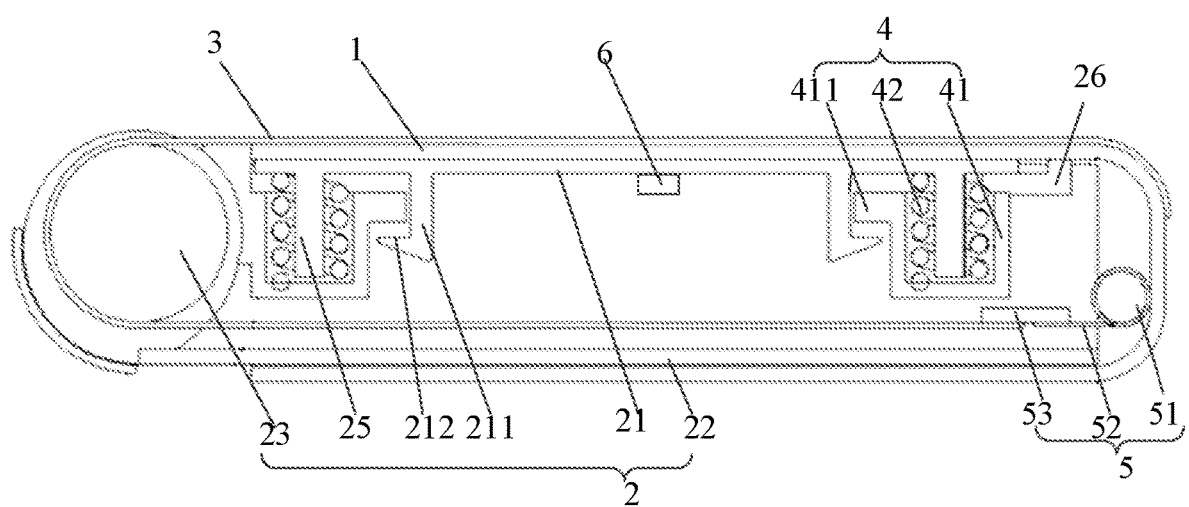
FIG. 3 is a schematic diagram of a sectional view of A-A in FIG. 1 according to an embodiment of the present disclosure.

An embodiment of the present disclosure provides a display apparatus. Referring to FIGS. 1-3, the display apparatus includes: a first housing 1, a second housing 2, a flexible display screen 3 and at least one elastic assembly 4.

One end of the first housing 1 includes an opening. The second housing 2 is slidably connected to the first housing 1 and configured to slide out of a cavity of the first housing 1 via the opening of the first housing 1. A first end of the flexible display screen 3 is connected to a first lateral outer surface of the first housing 1. A second end of the flexible display screen 3 bypasses one end of the second housing 2 away from the first housing 1 and connects to the inside of the first housing 1. The flexible display screen 3 is configured to slide out of the cavity of the first housing 1 along with the second housing 2 when the second housing 2 slides out of the cavity of the first housing 1. The elastic assembly 4 is configured to provide an elastic force to the second housing 2 when the second housing 2 slides out of the cavity of the first housing 1 so that a second lateral outer surface is kept flush with the first lateral outer surface, wherein the second lateral outer surface is a surface of the second housing 2 close to the first lateral outer surface.

In the display apparatus provided in this embodiment of the present disclosure, the flexible display screen 3 can slide out of the cavity of the first housing 1 along with second housing 2 when the second housing 2 slides out of the cavity of the first housing 1, thereby changing a display area of the flexible display screen 3. In addition, due to the elastic assembly 4, when the second housing 2 slides out of the cavity of the first housing 1, the second lateral outer surface can be kept flush with the first lateral outer surface under the action of an elastic force, which eliminates a level difference between the second lateral outer surface and the first lateral outer surface, avoids a mold mark on the flexible display screen caused by the level difference, and resolves a problem that the flexible display screen cannot be supported flatly due to the level difference.

The first housing 1 is a rigid structural member, and may be of a groove structure. For example, the first housing 1 is of a U-shaped, square, or circular groove structure with an opening. When the first housing 1 is of the U-shaped groove structure with the opening, a thickness of the first housing 1 can be reduced as far as possible on the premise that other components need to be stored in the first housing 1, so as to ensure that a thickness of the display apparatus is small, which is conducive to thinning design of the display apparatus.

Optionally, a winding component 5 may be stored in the first housing 1. A second end of the flexible display screen 3 is connected to the winding component 5. In this case, the flexible display screen 3 is further configured to: under the action of the winding component 5, slide into the first housing 1 along with the second housing 2 when the second housing 2 slides into the first housing 1. Due to the winding component 5 disposed in the first housing 1, the flexible display screen 3 can be stored when the second housing 2 slides into the first housing 1.

The second housing 2 is a rigid structural member. The second housing 2 may be a structural member with an opening at one end. Alternatively, the second housing 2 may include no opening. When the second housing 2 includes the opening at the end, the opening may be at one end of the second housing 2 close to the first housing 1, and the second housing 2 may be of a U-shaped, square, or circular groove structure with an opening. When the second housing 2 is of the U-shaped groove structure with the opening, a thickness of the second housing 2 can be reduced as far as possible on the premise that other components need to be stored in the second housing 2, so as to ensure that a thickness of the display apparatus is small, which is conducive to thinning design of the display apparatus. In addition, when the second housing 2 includes the opening at the end close to the first housing 1, it can yield a battery and other components in the first housing 1 when it slides out and/or into the first housing 1. It is to be understood that when the second housing 2 includes no opening, locations of the battery and other components need to be set to off a sliding track of the second housing 2. In order to realize a slidable connection between the second housing 2 and the first housing 1, it is obvious to set a sliding assembly between them (for example, a combination of either a slide way or a slide rail and either a slide block or a pulley). Setting of the sliding assembly is easily understood and realized by people skilled in the art. Details are not described herein.

The flexible display screen 3 is a soft, deformable and bendable display screen which can be easily understood or known by people skilled in the art. Its structure or display principle is not a protection key point of the present disclosure. Details are not described herein.

Corresponding to an implementation in which the first housing 1 is not provided with the winding component 5, the flexible display screen 3 includes a first part and a second part which are connected to each other. In an implementation, the first part is laid on the first lateral outer surface, that is, no matter whether the second housing 2 slides out of the cavity of the first housing 1, the first part is laid on the first lateral outer surface; and the second part is configured to: when the second housing 2 is disposed in the cavity of the first housing 1, be disposed in the cavity of the first housing 1; and when the second housing 2 slides out of the cavity of the first housing 1, slide out of the cavity of the first housing 1 along with the second housing 2, and be laid on the second lateral outer surface. In another implementation, the flexible display screen 3 is configured to: when the second housing 2 slides out of the cavity of the first housing 1, slide out of the cavity of the first housing 1 along with the second housing 2, and be laid on the first lateral outer surface and the second lateral outer surface; and when the second housing 2 is disposed in the cavity of the first housing 1, be disposed in the cavity of the first housing 1.

Corresponding to an implementation in which the first housing 1 is provided with the winding component 5, in addition to functions of the flexible display screen when the winding component 5 is not provided, the second part is further configured to: under the action of the winding component 5, slide into the first housing 1 along with the second housing 2 when the second housing 2 slides into the first housing 1.

The elastic assembly 4 has capabilities of deforming and recovering, and can provide an elastic force to the second lateral outer surface of the second housing 2 when the second housing 2 slides out of the cavity of the first housing 1 so that the second lateral outer surface is kept flush with the first lateral outer surface. Optionally, there is one or more elastic assemblies 4. When there is one elastic assembly 4, in a possible implementation, the elastic assembly 4 may be disposed in the center of the second lateral outer surface. In another possible implementation, there may be four elastic assemblies 4. Every two of the four elastic assemblies 4 form a group. Each group of the elastic assemblies 4 are arranged in a first direction a. The first direction a is perpendicular to a stretching direction of the flexible display screen 3. For example, each group of the elastic assemblies 4 are disposed at two ends of the second housing 2 in the first direction a. The two groups of the elastic assemblies 4 may be disposed at an end of the second housing 2 near the opening and an end of the second housing 2 away from the opening, respectively.

The winding component 5 has a winding function, and can store the flexible display screen 3 partially or completely via winding so that when the second housing 2 slides out of the cavity of the first housing 1, the flexible display screen 3 is partially or completely pulled out of the cavity of the first housing 1; and when the second housing 2 slides into the cavity of the first housing 1, the flexible display screen 3 is partially or completely stored in the cavity of the first housing 1.

According to the above, in the display apparatus provided in the present disclosure, due to the at least one elastic assembly 4, when the second housing 2 slides out of the cavity of the first housing 1, the second lateral outer surface of the second housing 2 is flush with the first lateral outer surface of the first housing 1, which eliminates a level difference, and avoids a mold mark on the flexible display screen 3 caused by the level difference. In addition, when the second lateral outer surface is flush with the first lateral outer surface, the flexible display screen 3 has a flat support surface on the lower side, thereby improving touch effectiveness.

In this specification, the term "and/or" is merely an association relationship that describes associated objects, represents that there may be three relationships, and is specifically understood as any one of the following cases: both A and B exist, only A exists, and only B exists.

Figure 4:
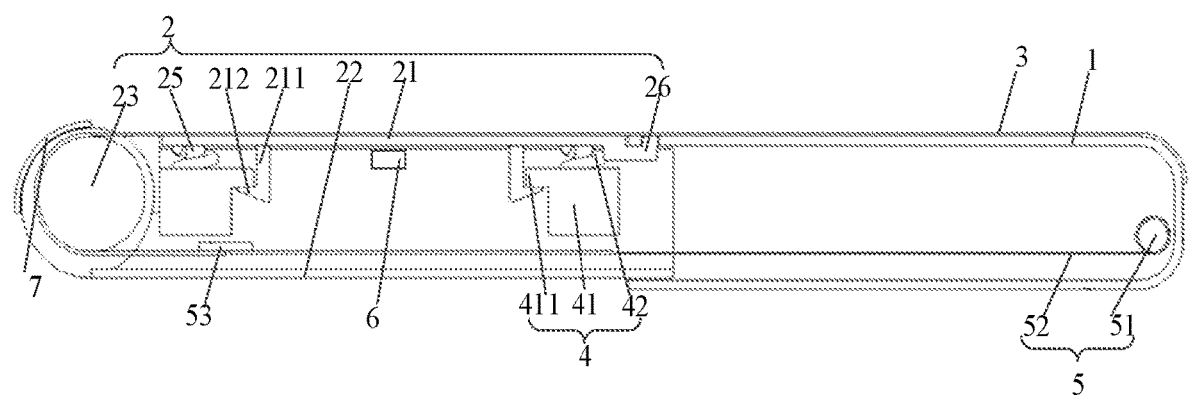
FIG. 4 is a schematic diagram of a sectional view of B-B in FIG. 2 according to an embodiment of the present disclosure.

Further, referring to FIGS. 3 and 4, the second housing 2 includes a movable plate 21 and a fixed base 22. In this case, a surface of the movable plate 21 close to the first lateral outer surface is the second lateral outer surface of the second housing 2. Accordingly, the elastic assembly 4 is disposed on one side of the fixed base 22 facing the movable plate 21, so that the movable plate 21 can move away from/towards the fixed base 22.

In order to realize that the second lateral outer surface can be flush with the first lateral outer surface of the first housing 1 under the action of the elastic component 4, in this embodiment of the present disclosure, the second housing 2 is set to include two parts: the movable plate 21 and the fixed base 22. The elastic component 4 is located between the movable plate 21 and the fixed base 22. In this way, not only is the movable plate 21 connected to the fixed base 22 so that the movable plate 21 can slide into or out of the first housing 1 along with the fixed base 22, but also the movable plate 21 can move close to or away from the fixed base 22 under the action of the elastic component 4.

When the flexible display screen 3 needs to be stored into the first housing 1 to reduce an image display area of the display apparatus, the following manner may be used: the movable plate 21 is pressed downwards to make its height lower than that of the first lateral outer surface of the first housing 1, and the second housing 2 is slid into the first housing 1. On the contrary, when the flexible display screen 3 needs to be pulled out of the first housing 1 to enlarge a display area, the second housing 2 is pulled outwards. At this time, the movable plate 21 is naturally jacked up under the elastic force of the elastic component 4 to be flush with the first housing 1, so as to eliminate a level difference.

Certainly, referring to FIGS. 1-2, it is obvious that a lateral plate 24 is disposed between the movable plate 21 and the fixed base 22. Two ends of the lateral plate 24 are connected to the movable plate 21 and the fixed base 22, respectively, to shield and protect an internal structure of the display apparatus and ensure that an appearance of the display apparatus is beautiful. The setting manner is not excessively limited herein.

Further, referring to FIGS. 3-4, the elastic assembly 4 includes a mounting base 41 and an elastic piece 42. The mounting base 41 is disposed on one side of the fixed base 22 facing the movable plate 21; the mounting base 41 includes a cavity; and one end of the mounting base 41 facing the movable plate 21 includes an opening. The elastic piece 42 is disposed in the cavity of the mounting base and configured to abut on the movable plate 21 and the mounting base 41. For example, two opposite ends of the elastic piece 42 may abut on the movable plate 21 and the mounting base 41, respectively.

Due to the setting of the elastic assembly 4, the elastic piece 42 can be pressed downwards by the movable plate 21, and the movable plate 41 can be jacked up by the elastic piece 42. Optionally, the elastic piece 42 is a structure or component having capabilities of deforming and recovering. For example, the elastic piece 42 is a spring or a rubber part. It is to be understood that the mounting base 41 does not move up and down along with the movable plate 21.

Figure 6:
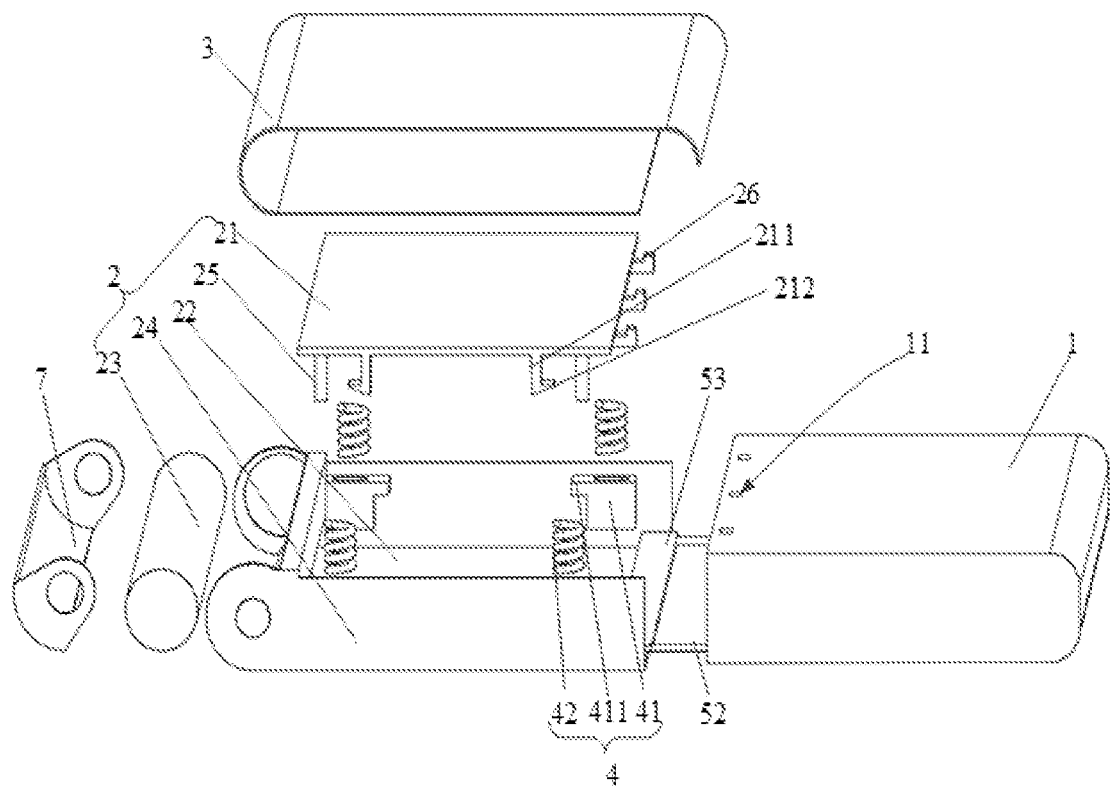
FIG. 6 is a schematic exploded structural diagram of a display apparatus according to an embodiment of the present disclosure.

Further, in order to realize that the mounting base 41 is fixedly arranged between the fixed base 22 and the movable plate 21, and that the movable plate 21 can slide into or out of the first housing 1 along with the fixed base 22, in this embodiment of the present disclosure, as shown in FIGS. 3-4, the mounting base 41 may be fixedly connected to the fixed base 22, to ensure that the mounting base 41 is fixed and provide a sufficient support force to the elastic piece 42. For example, referring to FIG. 3, a left side of the mounting base 41 on the left of FIG. 3 is connected to the fixed base 22, and although a connection relationship between the mounting base 41 on the right of FIG. 3 and the fixed base 22 is not shown, during actual implementation, at least one surface (for example, an upper surface, a lower surface, and/or a left surface) of the mounting base 41 is directly connected to the fixed base 22, or is indirectly connected to the fixed base 22 via the side plate 24, as shown in FIG. 6. In addition, referring to FIG. 4, FIG. 4 is a schematic structural diagram which does not include the side plate 24. It can be seen that the entire mounting base 41 is a groove structure with an opening at an upper end, and can be connected to the side plate 24.

Optionally, one side of the movable plate 21 facing the fixed base 22 includes a limit post 25, and the limit post 25 is configured to abut on the elastic piece. As the side of the movable plate 21 facing the fixed base 22 includes the limit post 25, when the limit post 25 is inserted into the cavity of the mounting base 41, the limit post 25 and the mounting base 41 can perform a spacing function in a left-right direction (for example, a stretching direction of the flexible display screen 3) so that when the fixed base 22 slides into or out of the first housing 1, due to a relationship between the limit post 25 and the mounting base 41, the movable plate 21 can slide into or out of the first housing 1 along with the fixed base 22 synchronously.

Optionally, a length of the limit post 25 may be greater than a thickness of the movable plate 21, so as to ensure that when the movable plate 21 moves up to a location flush with the first housing 1, the limit post 25 does not fall out of the mounting seat 41. A thickness direction of the movable plate 21 intersects a radial direction of the limit post 25. For example, the thickness direction of the movable plate 21 is perpendicular to the radial direction of the limit post 25.

In an implementation, the elastic piece 42 may surround the limit post 25 along the circumferential direction of the limit post 25. For example, when the elastic piece 42 is a spring, the spring may be directly sleeved on the limit post 25 and disposed in the mounting base 41; when the elastic piece 42 is a rubber piece, it may be circular or blocky; when the elastic piece 42 is circular, it may be sleeved on the limit post 25 as the spring; and when the elastic piece 42 is blocky, it may be uniformly distributed at the periphery of the limit post 25.

Further, referring to FIGS. 3 and 4, the side of the movable plate 21 facing the fixed base 22 may be provided with a first limiting piece 211, the first limiting piece 211 extends towards the fixed base 22, and a second limiting piece 411 matching first limiting piece 211 is disposed on the mounting base 41. When the movable plate 21 moves away from the fixed base 22 under the action of an elastic force, the second limiting piece 411 is configured to abut on the first limiting piece 211, to ensure that the movable plate 21 moves away from the fixed base 22 within a preset distance.

In this embodiment of the present disclosure, as the preset distance is set, the first limiting piece 211 is arranged on the movable plate 21, and the second limiting piece 411 matching the first limiting piece 211 is arranged on the mounting base 41, the movable plate 21 can be just jacked up to a location flush with the first housing 1, to avoid a level difference caused when a height of the movable plate 21 jacked up by the elastic assembly 4 is too large and the movable plate 21 is higher than the first housing 1. The preset distance herein is a moving distance of the movable plate 21 from a location in the cavity of the first housing 1 to a location where the movable plate 21 is flush with the first lateral outer surface of the first housing 1.

In a possible implementation, referring to FIG. 4, the first limiting piece 211 extends from the movable plate 21 to the fixed base 22. One end of the first limiting piece 211 facing the fixed base 22 includes a bending part 212. The second limiting piece 411 is a hook matching the bending part 212. The bending part 212 and the second limiting piece 411 may form surface-contact hook spacing shown in the figure, or form point-contact hook spacing, provided that hook spacing can be performed in a deformation direction of the elastic piece 42.

Figure 5:
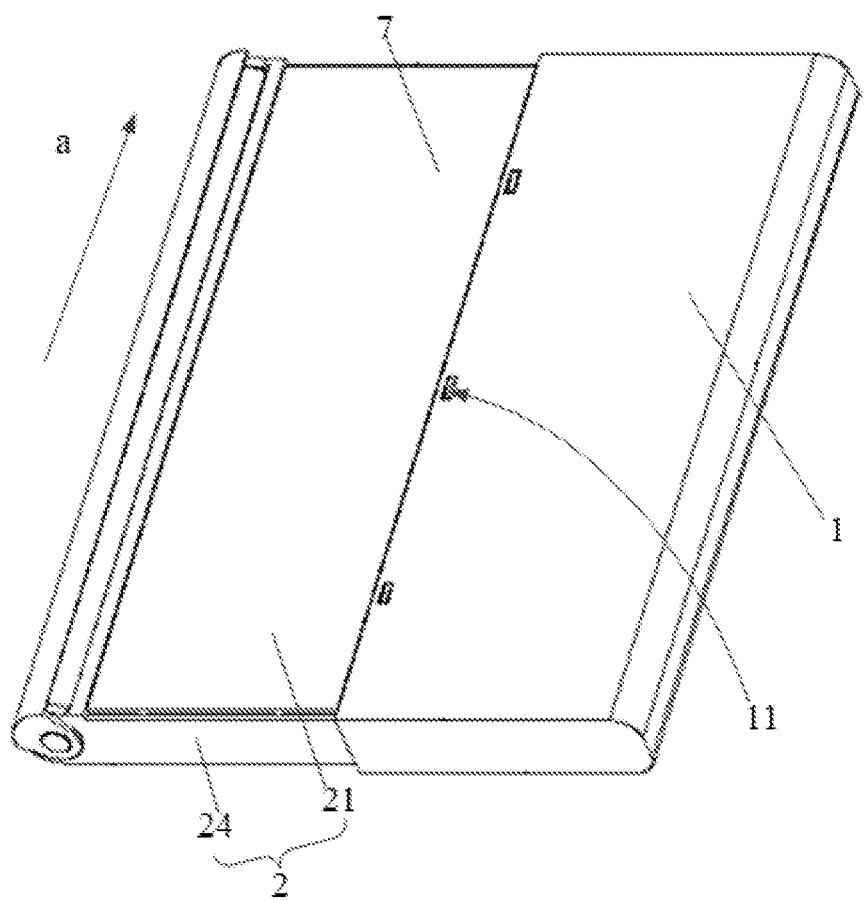
FIG. 5 is a schematic structural diagram of a part of a display apparatus according to an embodiment of the present disclosure.

Further, referring to FIGS. 4 and 5, a surface of a first side of the first housing 1 includes a first fastener 11; and a surface of the second housing 2 close to the first side of the first housing 1 includes a second fastener 26 matching the first fastener 11. The second fastener 26 is configured to clamp on the first fastener 11 when the second housing 2 slides out of the cavity of the first housing 1 by a sliding distance, so as to fix the second housing 2 after the second housing 2 slides out of the first housing 1, that is, prevent the second housing 2 from departing from the first housing 1.

In a possible implementation, the surface of the first side of the first housing 1 includes a plurality of groups of first fasteners 11. The plurality of groups of first fasteners 11 correspond to a plurality of sliding distances. A group of first fasteners 11 corresponding to any of the sliding distances is configured to clamp on the second fastener 26 when the second housing 2 slides out of the cavity of the first housing 1 by the any of the sliding distances. Each group of first fasteners 11 may include one or more first fasteners 11.

In another possible implementation, the surface of the second housing 2 close to the first side of the first housing 1 includes a plurality of groups of second fasteners 26 matching the first fastener 11. The plurality of groups of second fasteners 26 correspond to a plurality of sliding distances. A group of second fasteners 26 corresponding to any of the sliding distances are configured to clamp on the first fastener 11 when the second housing 2 slides out of the cavity of the first housing 1 by the any of the sliding distances. Each group of second fasteners 26 may include one or more second fasteners 26. In addition, when there is a plurality of groups of first fasteners 11 or second fasteners 26, there may be one group of second fasteners 26 or first fasteners 11.

It is assumed that there are a plurality of groups of first fasteners 11 and a plurality of groups of second fasteners which correspond to a plurality of sliding distances. When the second housing 2 slides out of the first housing 1, the first fasteners 11 and the second fasteners 26 clamp on each other to keep the second housing 2 at a preset location. Therefore, when the flexible display screen 3 is pulled out from the cavity of the first housing 1 by different lengths, and the display apparatus uses different display areas, the first fasteners 11 and the second fasteners 26 can clamp on each other, to realize fixing between the first housing 1 and the second housing 2.

When each group of first fasteners 11 includes a plurality of first fasteners 11, and each group of second fasteners 26 includes a plurality of second fasteners 26, the plurality of first fasteners 11 and the plurality of second fasteners 26 can share action forces on the first fasteners 11 and the second fasteners 26 together, and stress on each of the first fasteners 11 and the second fasteners 26 can be balanced better, thereby ensuring stability of clamping between the first fasteners 11 and the second fasteners 26, and prolonging service lives of the first fasteners 11 and the second fasteners 26. There may be one of the first fasteners 11 at each end of a first direction a, or at each of two ends and the center of the first direction a. There may be one of the second fasteners 26 at each end of the first direction a, or at each of two ends and the center of the first direction a. This is not specifically limited herein.

In addition, when any group of first fasteners 11 includes a plurality of first fasteners 11, the plurality of first fasteners 11 may be arranged at one end of the first housing 1 close to its opening in the first direction a at intervals. As shown in FIGS. 1-2, the first direction a is perpendicular to a stretching direction of the flexible display screen 3. Similarly, when any group of second fasteners 26 includes a plurality of second fasteners 26, the plurality of second fasteners 26 may be arranged at one end of the second housing 2 close to the first housing 1 in the first direction a at intervals.

In addition, locations of the first fasteners 11 and the second fasteners 26 can also be adjusted according to application requirements. For example, the first fasteners 11 may not be set on the surface of the first side of the first housing 1, and/or the second fasteners 26 may not be set on the surface of the second housing 2 close to the first side of the first housing 1, provided that a sliding distance between the first housing 1 and the second housing 2 can be fixed via clamping between the first fasteners 11 and the second fasteners 26.

In a possible implementation, to realize clamping between the first fastener 11 and the second fastener 26, in this embodiment of the present disclosure, the first fastener 11 may be set to a clamping hole, and the second fastener 26 may be set to a clamp. Referring to FIG. 4, there may be a yielding step between the clamp and the movable plate 21, so that the clamp can be inserted into the clamping hole. In addition, the first lateral outer surface of the first housing 1 which is faced by the clamp needs to be flush with the second lateral outer surface of the second housing 2.

Alternatively, settings opposite to the foregoing are used: the first fastener 11 is set to a clamp extending towards the second housing 2, and the second fastener 26 is set to a clamping hole. In this case, a surface of the clamping hole does not need to be flush with the outer surface of the second housing 2.

In addition, no matter whether the first fastener 11 or the second fastener 26 is set to a clamping hole, the clamping hole may be set to a through hole or blind hole as required. When the clamping hole is a blind hole, a surface of the lamping hole does not need to be flush with the outer surface of the second housing 2 or the first housing 1, and it is ensured that the first housing 1 can provide a sufficient support force for the flexible display screen 3.

With reference to the foregoing descriptions, when the flexible display screen 3 needs to be stored into the first housing 1 to reduce a display area of the display apparatus, the following manner may be used: the movable plate 21 is pressed downwards to release clamping between the first fastener 11 and the second fastener 26, and the second housing 2 is slid into the first housing 1. On the contrary, when the flexible display screen 3 needs to be pulled out of the first housing 1 to enlarge the display area of the display apparatus, the following manner may be used: the second housing 2 is pulled outwards so that the movable plate 21 is naturally jacked up under the elastic force of the elastic component 4 to be flush with the first housing 1, and the first fastener 11 and the second fastener 26 are controlled to clamp one each other.

Optionally, as shown in FIGS. 3, 4 and 6, the end of the second housing 2 away from the first housing 1 includes a rotating shaft 23. A second end of the flexible display screen 3 bypasses the rotating shaft 23 and is fixedly connected to the inside of the first housing 1. For example, the end of the fixed base 22 away from the first housing 1 may be provided with a rotating shaft 23. The rotating shaft 23 may be arranged in the first direction a. The flexible display screen 3 bypasses the rotating shaft 23 and connects to the winding component 5.

Due to the arrangement of the rotating shaft 23, a frictional force generated when the flexible display screen 3 slides into and/or out of the first housing 1 along with the second housing 2 is reduced, thereby avoiding a problem that a mold mark is formed on the flexible display screen 3 in a stretching process, and prolonging a service life of the flexible display screen 3.

Further, referring to FIGS. 4-5, the display apparatus provided in this embodiment of the present disclosure further includes a sensor 6. When there is a winding component 5 in the first housing 1, the sensor 6 is electrically connected to the winding component 5. The sensor 6 is configured to: send a working signal indicating an execution of winding to the winding component 5 when detecting that a distance between the second lateral outer surface and a third lateral outer surface is becoming smaller, or send a working signal indicating a stopping of winding to the winding component 5 when detecting that the distance between the second lateral outer surface and the third lateral outer surface is becoming larger or remains unchanged, wherein the third lateral outer surface is an outer surface of the second housing away from the first lateral outer surface.

As the sensor 6 is arranged to assist working of the winding component 5, linkage between the winding component 5 and the second housing 2 can be realized, and the flexible display screen 3 can be stored in time. Optionally, the sensor 6 may be a range sensor or a position sensor. When the sensor 6 is the range sensor, and the movable plate 21 is disposed in the first housing 1, a distance between the movable plate 21 and the fixed base 22 is set to a standard distance. When the distance between the movable plate 21 and the fixed base 22 is becoming larger than the standard distance or remains unchanged as the standard distance, the range sensor sends the working signal indicating a stopping of winding to the winding component 5. When the distance between the movable plate 21 and the fixed base 22 is becoming smaller than the standard distance, the range sensor sends the working signal indicating a stopping of winding to the winding component 5.

In a possible implementation, to store the flexible display screen 3 by using the winding component 5, the winding component 5 in this embodiment of the present disclosure includes a winding motor (not shown in the figure) and a winding shaft 51. The sensor 6 is electrically connected to the winding motor (not shown in the figure). The winding shaft 51 is connected to an output end of the winding motor (not shown in the figure). The winding shaft 51 is arranged in the first direction a. The winding motor is configured to work based on the signals sent by the sensor 6. A work process of the winding motor includes: when receiving the working signal indicating an execution of winding, the winding motor drives the winding shaft 51 to rotate, so as to store the flexible display screen 3. Accordingly, when receiving the working signal indicating a stopping of winding, the winding motor stops rotating, so that the flexible display screen 3 is pulled out under the action of an external force.

Optionally, the winding motor (not shown in the figure) may include a built-in controller (system), or may be equipped with an external controller (system). For example, the controller (system) herein may alternatively be a relay switch.

In a possible implementation, the display apparatus further includes a flexible connector 52. The flexible connector 52 is configured to connect the flexible display screen 3 with the winding shaft 51. For example, the winding shaft 51 is connected to one end of the flexible connector 52, and the other end of the flexible connector 52 is connected to a second end of the flexible display screen 3.

In addition, the flexible connector 52 is further configured as follows: when the second housing 2 completely slides into the first housing 1, at least part of the flexible connector 52 is wound on the winding shaft 51, while the flexible display screen 3 is not wound on the winding shaft 51. For example, the flexible connector 52 may have such a preset length that when the second housing 2 slides into the first housing 1, at least part of the flexible connector 52 is wound on the winding shaft 51, while the flexible display screen 3 is not wound on the winding shaft 51.

In this way, due to the arrangement of the flexible connector 52, when the flexible connector 52 is wound on the winding shaft 51, the flexible display screen 3 is not wound on the winding shaft 51, thereby avoiding a problem that a display performance of the flexible display screen 3 is impacted because it is wound on the winding shaft 51.

In addition, referring to FIG. 4, the flexible display screen 3 and the flexible connector 52 may be directly connected to each other, or may be indirectly connected to each other via a connection plate 53. Due to the arrangement of the connection plate 53, the flexible display screen 3 can be further prevented from being wound on the winding shaft 51.

Further, the display apparatus provided in this embodiment of the present disclosure further includes a fixing piece. The fixing piece is disposed at the end of the second housing 2 away from the first housing 1. The fixing piece is configured to: when the second housing 2 slides out of the cavity of the first housing 1 by the sliding distance, fix the flexible display screen 3 at the end of the second housing 2 away from the first housing 1, for example, press the flexible display screen 3 to prevent it from curling at the end of the second housing 2 away from the first housing 1.

In a possible implementation, referring to FIGS. 1-5, the fixing piece may be a depression bar 7. The depression bar 7 is rotationally arranged at one end of the second housing 2 away from its opening so that the depression bar 7 can rotate at the end of the second housing 2 away from the first housing 1. When rotating to a location on the upper side of the rotating shaft 23, the depression bar 7 can press the flexible display screen 3. The depression bar 7 is arranged in the first direction a. The first direction a is perpendicular to a stretching direction of the flexible display screen 3. In addition, the fixing piece may be a component which can fix the flexible display screen 3, such as a card holder.

After being pulled out, the flexible display screen 3 may cock by 1 to 3 mm near the rotating shaft 23 under the action of its rebound, which goes against flatness of the flexible display screen 3. In this embodiment of this application, the fixing part is arranged to fix the flexible display screen 3 so that overall flatness of the flexible display screen 3 and an overall display effect of the display apparatus can be improved. In addition, when the depression bar 7 rotates to one side of the rotating shaft 23 away from the first housing 1, the flexible display screen 3 can be protected from being collided or rubbed.

Optionally, the depression bar 7 may be of a transparent arc structure, and may be arranged eccentrically to the rotating shaft 23 in the first direction a. In addition, a rotation relationship between the depression bar 7 and the second housing 2 may be interference fit so that the depression bar 7 can stay in any location in a rotation process.

An embodiment of the present disclosure provides an electronic device, including the display apparatus provided in the foregoing embodiments of the present disclosure. For its detailed structure and implementations, refer to the foregoing descriptions. Details are not described herein.

It should be noted that, the foregoing descriptions are merely exemplary embodiments of the present disclosure, and do not constitute any limitation on forms of the present disclosure. Therefore, the foregoing embodiments can be combined. Any simple modification, equivalent change and improvement made to the present disclosure based on its technical essence shall fall within the scope of the technical solutions of the present disclosure.

What is claimed is:

1. A display apparatus, comprising:
   a first housing, one end of which comprises an opening;
   a second housing slidably connected to the first housing and configured to slide out of a cavity of the first housing via the opening of the first housing;
   a flexible display screen, wherein a first end of the flexible display screen is connected to a first lateral outer surface of the first housing; a second end of the flexible display screen bypasses one end of the second housing away from the first housing and connects to the inside of the first housing; and the flexible display screen is configured to slide out of the cavity of the first housing along with the second housing when the second housing slides out of the cavity of the first housing; and
   at least one elastic assembly configured to provide an elastic force to the second housing when the second housing slides out of the cavity of the first housing so that a second lateral outer surface is kept flush with the first lateral outer surface, wherein the second lateral outer surface is a surface of the second housing close to the first lateral outer surface.

2. The display apparatus according to claim 1, wherein the second housing comprises a cavity, and one end of the second housing close to the first housing comprises an opening.

3. The display apparatus according to claim 2, wherein the second housing comprises a movable plate and a fixed base, and a surface of the movable plate close to the first lateral outer surface is the second lateral outer surface; and
   the elastic assembly is on one side of the fixed base facing the movable plate.

4. The display apparatus according to claim 3, wherein the elastic assembly comprises a mounting base and an elastic piece;
   the mounting base is on one side of the fixed base facing the movable plate; the mounting base comprises a cavity; and one end of the mounting base facing the movable plate comprises an opening; and
   the elastic piece is in the cavity of the mounting base and configured to abut on the movable plate and the mounting base.

5. The display apparatus according to claim 4, wherein one side of the movable plate facing the fixed base comprises a limit post, and the limit post is configured to abut on the elastic piece.

6. The display apparatus according to claim 5, wherein the elastic piece surrounds the limit post along a circumferential direction of the limit post.

7. The display apparatus according to claim 5, wherein a length of the limit post is greater than a thickness of the movable plate; and a thickness direction of the movable plate intersects a radial direction of the limit post.

8. The display apparatus according to claim 4, wherein one side of the movable plate facing the fixed base comprises a first limiting piece; the mounting base comprises a second limiting piece matching the first limiting piece; and the second limiting piece is configured to abut on the first limiting piece when the movable plate moves away from the fixed base under the action of the elastic force, to ensure that the movable plate moves within a preset distance.

9. The display apparatus according to claim 1, wherein a surface of a first side of the first housing comprises a first fastener; and a surface of the second housing close to the first side of the first housing comprises a second fastener matching the first fastener; and
   the second fastener is configured to clamp on the first fastener when the second housing slides out of the cavity of the first housing by a sliding distance.

10. The display apparatus according to claim 9, wherein the surface of the first side of the first housing comprises a plurality of groups of first fasteners; the plurality of groups of first fasteners correspond to a plurality of sliding distances; and a group of first fasteners corresponding to any of the sliding distances is configured to clamp on the second fastener when the second housing slides out of the cavity of the first housing by the any of the sliding distances.

11. The display apparatus according to claim 9, wherein the surface of the second housing close to the first side of the first housing comprises a plurality of groups of second fasteners matching the first fastener; the plurality of groups of second fasteners correspond to a plurality of sliding distances; and a group of second fasteners corresponding to any of the sliding distances is configured to clamp on the first fastener when the second housing slides out of the cavity of the first housing by the any of the sliding distances.

12. The display apparatus according to claim 11, wherein there are a plurality of first fasteners and a plurality of second fasteners which correspond to the same sliding distance.

13. The display apparatus according to claim 1, wherein the inside of the first housing comprises a winding component; a second end of the flexible display screen is connected to the winding component; and the flexible display screen is further configured to: slide into the first housing along with the second housing under the action of the winding component when the second housing slides into the first housing.

14. The display apparatus according to claim 13, wherein the display apparatus further comprises a sensor; and the sensor is electrically connected to the winding component, and is configured to: send a working signal indicating an execution of winding to the winding component when detecting that a distance between the second lateral outer surface and a third lateral outer surface is becoming smaller, or send a working signal indicating a stopping of winding to the winding component when detecting that the distance between the second lateral outer surface and the third lateral outer surface is one of becoming larger and remaining unchanged, wherein the third lateral outer surface is an outer surface of the second housing away from the first lateral outer surface.

15. The display apparatus according to claim 14, wherein the winding component comprises a winding motor and a winding shaft; the sensor is electrically connected to the winding motor; the winding shaft is connected to an output end of the winding motor; and the winding motor is configured to work based on the working signals.

16. The display apparatus according to claim 15, wherein the display apparatus further comprises a flexible connector; the flexible connector is configured to connect the flexible display screen to the winding shaft; and at least part of the flexible connector, instead of the flexible display screen, is wound on the winding shaft when the second housing completely slides into the first housing.

17. The display apparatus according to claim 1, wherein the end of the second housing away from the first housing comprises a depression bar; and the depression bar is configured to press the flexible display screen at the end of the second housing away from the first housing when the second housing slides out of the cavity of the first housing by a sliding distance.

18. The display apparatus according to claim 1, wherein the flexible display screen comprises a first part and a second part which are connected to each other; and the second part is configured to: when the second housing slides out of the cavity of the first housing, slide out of the cavity of the first housing along with the second housing, and be laid on the second lateral outer surface.

19. The display apparatus according to claim 13, wherein the flexible display screen comprises a first part and a second part which are connected to each other; and the second part is configured to: slide into the first housing along with the second housing under the action of the winding component when the second housing slides into the first housing.

20. An electronic device comprising a display apparatus, wherein the display apparatus comprises:
   a first housing, one end of which comprises an opening;
   a second housing slidably connected to the first housing and configured to slide out of a cavity of the first housing via the opening of the first housing;
   a flexible display screen, wherein a first end of the flexible display screen is connected to a first lateral outer surface of the first housing; a second end of the flexible display screen bypasses one end of the second housing away from the first housing and connects to the inside of the first housing; and the flexible display screen is configured to slide out of the cavity of the first housing along with the second housing when the second housing slides out of the cavity of the first housing; and
   at least one elastic assembly configured to provide an elastic force to the second housing when the second housing slides out of the cavity of the first housing so that a second lateral outer surface is kept flush with the first lateral outer surface, wherein the second lateral outer surface is a surface of the second housing close to the first lateral outer surface.

* * * * *